(12) United States Patent
Ryan, Jr. et al.

(10) Patent No.: US 7,398,247 B2
(45) Date of Patent: Jul. 8, 2008

(54) SECURE TAX METER AND CERTIFIED SERVICE PROVIDER CENTER FOR COLLECTING SALES AND/OR USE TAXES ON SALES THAT ARE MADE VIA THE INTERNET AND/OR CATALOG

(75) Inventors: Frederick W. Ryan, Jr., Oxford, CT (US); Vadim L. Stelman, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 1270 days.

(21) Appl. No.: 09/938,158

(22) Filed: Aug. 23, 2001

(65) Prior Publication Data

US 2003/0040992 A1    Feb. 27, 2003

(51) Int. Cl.
*G06Q 20/00* (2006.01)
(52) U.S. Cl. .......................................... 705/39; 705/31
(58) Field of Classification Search .................. 705/31, 705/19, 30
See application file for complete search history.

(56) References Cited

U.S. PATENT DOCUMENTS

| | | | |
|---|---|---|---|
| 4,750,119 A * | 6/1988 | Cohen et al. ................... 705/14 |
| 5,193,057 A | 3/1993 | Longfield ................... 364/408 |
| 5,335,169 A | 8/1994 | Chong ......................... 364/408 |
| 5,509,064 A | 4/1996 | Welner et al. |
| 5,644,724 A | 7/1997 | Cretzler |
| 5,646,389 A | 7/1997 | Bravman et al. |
| 5,799,283 A | 8/1998 | Francisco et al. ............. 705/19 |
| 5,875,433 A * | 2/1999 | Francisco et al. ............. 705/26 |
| 5,903,876 A | 5/1999 | Hagemier |
| 5,968,110 A | 10/1999 | Westrope et al. |
| 5,995,625 A | 11/1999 | Sudia et al. |
| H1830 H | 1/2000 | Petrimoulx et al. |
| 6,016,479 A | 1/2000 | Taricani, Jr. |
| 6,038,548 A | 3/2000 | Kamil |
| 6,041,317 A | 3/2000 | Brookner |
| 6,078,898 A | 6/2000 | Davis et al. |
| 6,078,899 A | 6/2000 | Francisco et al. ............. 705/19 |
| 6,085,324 A | 7/2000 | Ogram ....................... 713/202 |
| 6,141,650 A | 10/2000 | Iwasa et al. |
| 6,192,473 B1 | 2/2001 | Ryan, Jr. et al. |
| 6,199,049 B1 | 3/2001 | Conde et al. |

(Continued)

FOREIGN PATENT DOCUMENTS

EP           1286291           2/2003

(Continued)

OTHER PUBLICATIONS

Josten, R. Bruce, E-commerce Taxation: Issues in Search of Answers, U.S. Chamber of Commerce, Sep. 8, 1999, 16 pages.*

(Continued)

*Primary Examiner*—Andrew Joseph Rudy
(74) *Attorney, Agent, or Firm*—Ronald Reichman; Angelo N. Chaclas

(57) ABSTRACT

A system and method that enables sellers to control all aspects of their sales transaction and customer data, while still providing taxing jurisdictions with the assurance that sales and use taxes are properly being accounted for and calculated This is accomplished by placing the tax calculation and accounting functions at the seller's site, executed by a secure tax meter.

23 Claims, 5 Drawing Sheets

U.S. PATENT DOCUMENTS 6,202,052 B1 * 3/2001 Miller ......................... 705/31
6,223,187 B1 4/2001 Boothby et al.
6,311,171 B1 10/2001 Dent
6,321,256 B1 11/2001 Himmel et al.
6,697,787 B1 * 2/2004 Miller ......................... 705/31

FOREIGN PATENT DOCUMENTS

WO    WO 96/36948    11/1996
WO    WO01/11843    2/2001

OTHER PUBLICATIONS

Kerven, Anne, Silicon Mountain News, ColoradoBiz, Mar. 2000, Esalestax.com reference from pp. 3-4 of 8.*
State of North Carolina Request for Proposals RFP #001185 "Pilot Program For Streamlined Sales Tax System" June 16, 2000.

* cited by examiner

SECURE TAX METER AND CERTIFIED SERVICE PROVIDER CENTER FOR COLLECTING SALES AND/OR USE TAXES ON SALES THAT ARE MADE VIA THE INTERNET AND/OR CATALOG

CROSS REFERENCE TO RELATED APPLICATIONS

Reference is made to commonly assigned co-pending patent application Ser. No. 09/938,326 filed herewith entitled "A Secure Tax Meter For Collecting Sales And/Or Use Taxes On Sales That Are Made Via The Internet And/Or Catalog" in the names of Frederick W. Ryan, Jr. and Vadim Stelman; and to commonly assigned co-pending patent application Ser. No. 09/634,040 filed Aug. 8, 2000, entitled "A Method For Obtaining Secure Receipts For Sales And/Or Use Taxes That Are Made Via The Internet And/Or Catalog" in the name of Frederick W. Ryan, Jr.; and to commonly assigned co-pending patent application Ser. No. 09/634,041 filed Aug. 8, 2000, entitled "A Method For Collecting Sales And/Or Use Taxes That Are Made Via The Internet And/Or Catalog" in the names of Frederick W. Ryan, Jr., Michael W. Wilson, Vadim Stelman, Ronald P. Sansone, Theresa Biasi, and Kathleen A. Bishop.

FIELD OF THE INVENTION

This invention pertains to commercial transactions and, more particularly, to the collection of taxes for the sale and/or use of goods and/or services.

BACKGROUND OF THE INVENTION

From the dawn of history to the present day, governments have collected taxes to pay for their expenditures. One type of tax levied by governments is tax on the sale and/or use of goods and/or services. "Sales taxes" are usually imposed at a certain percent of the receipts from every retail sale of tangible personal property made in the taxing jurisdiction. "Use taxes" are usually imposed on the use of tangible personal property or taxable services within the taxing jurisdiction.

Currently in the United States, some cities, states, counties, districts, and boroughs collect sales and/or uses taxes on commercial transactions that take place in their jurisdictions. In fact, there are approximately 6,000 jurisdictions in the United States collecting sales and/or use taxes. The sales and/or use taxes are at many different rates and apply to different types of goods and/or services. For instance, the sales tax on clothing may be exempt from taxation in one jurisdiction and subject to taxation in another jurisdiction at a rate of 6% for all clothing sales over $100.00. The sales tax may also be based upon the amount of the substance that is contained in the product, i.e., juices having different amounts of concentrates are taxed at different rates in some jurisdictions. Some entities, like charities, Indian tribes, etc., may be subject to taxation in one jurisdiction and not in another.

Generally, a jurisdiction has the right or power to tax a commercial transaction if the commercial transaction takes place within the taxing jurisdiction, i.e., goods subject to a sales tax are sold by a store that is physically located within the taxing jurisdiction. Goods subject to a use tax are goods that are used, consumed or stored in the taxing jurisdiction. The taxing jurisdictions usually have no difficulty collecting sales taxes on sales in their taxing jurisdiction made by merchants physically located in the taxing jurisdiction. A buyer is responsible for the payment of the tax if the seller does not collect the tax. However, the taxing jurisdictions usually find it difficult to collect taxes on the sale and/or use of goods and/or services that are made in a different jurisdiction and delivered and/or performed in the taxing jurisdiction. There has been a tremendous increase in the number of commercial transactions that are or may be subject to a sales and/or use tax that are taking place over the Internet or from catalogs. The taxing jurisdictions are having difficulty collecting sales and/or use taxes that are made via the Internet and catalogs.

Currently, sellers of goods and/or services have difficulty complying with the sales and/or use tax, government-mandated seller administrative functions. Sales tax administrative functions include determination and calculation of the amount of tax due, collection of the tax, remittance of the tax, and filing reports of the tax to the appropriate governmental agency. The seller of the goods/and or services also has to maintain adequate records since the government may audit the seller.

In some existing tax collection systems, a representative of a taxing jurisdiction must physically visit a seller in order to audit the seller. As a result, the seller, to some degree, can control the amount of information and content of information to which any given taxing jurisdiction has access. For example, a seller may not show the taxing jurisdiction all of the relevant information, or the taxing jurisdiction may view information that it is not entitled to view.

In other existing tax collection systems, an agent provides an online service that performs the sales tax administration functions of a seller, thereby relieving the seller of a portion of the tax compliance burden. However, some sellers are uneasy about relying upon an agent as an integral part of their sales tax transaction processing and providing the agent with a significant amount of transaction detail, e.g., customer addresses. Sellers would prefer to control all aspects of their transaction processing, including tax compliance. Taxing jurisdictions are concerned that sellers might modify their tax compliance systems and defraud the taxing jurisdictions. Therefore, the taxing jurisdictions would prefer that a trusted third party (which the States could more easily audit) be responsible for tax calculation and collection.

SUMMARY OF THE INVENTION

This invention overcomes the disadvantages of the prior art by providing a system and method that removes sellers' objections to some existing system by enabling sellers to control all aspects of their transaction and customer data, while still providing taxing jurisdictions with the assurance that sales and use taxes are being properly accounted for and calculated. This is accomplished by placing the tax calculation and accounting functions at the seller's site, executed by a secure tax meter, i.e., a tamper-resistant computing environment.

The secure tax meter also achieves the taxing jurisdictions' goals of increased assurance of correct tax calculation, increased retailer compliance, and decreased taxing jurisdiction audit burden. The placing of a secure tax meter at a seller's site effectively extends the agent data center operation to the seller's site, providing the same benefits to the taxing jurisdictions as existing data center agent systems do.

The secure tax meter calculates the tax rate for each transaction, securely maintains a record of all transactions, securely maintains an aggregate of all transactions for each tax jurisdiction, enables the taxing jurisdictions to remotely audit detailed transaction records, provides the taxing jurisdictions a mechanism to update tax rate tables, and enables a trusted third party agent to perform the sales tax administrative functions of a seller, relieving the seller of as much as possible of the burden of compliance.

The secure tax meter may also be used to detect improper or fraudulent behavior by the seller. For instance, the secure tax meter may be used to detect partial reporting of taxes to the taxing jurisdiction for seller's sales and/or the failure to report seller's sales to the taxing jurisdiction. The secure tax meter also may be able to obtain evidence of improper seller conduct in the reporting and/or collecting of sales and/or use taxes.

DETAILED DESCRIPTION OF THE PREFERRED EMBODIMENTS

Figure 1:
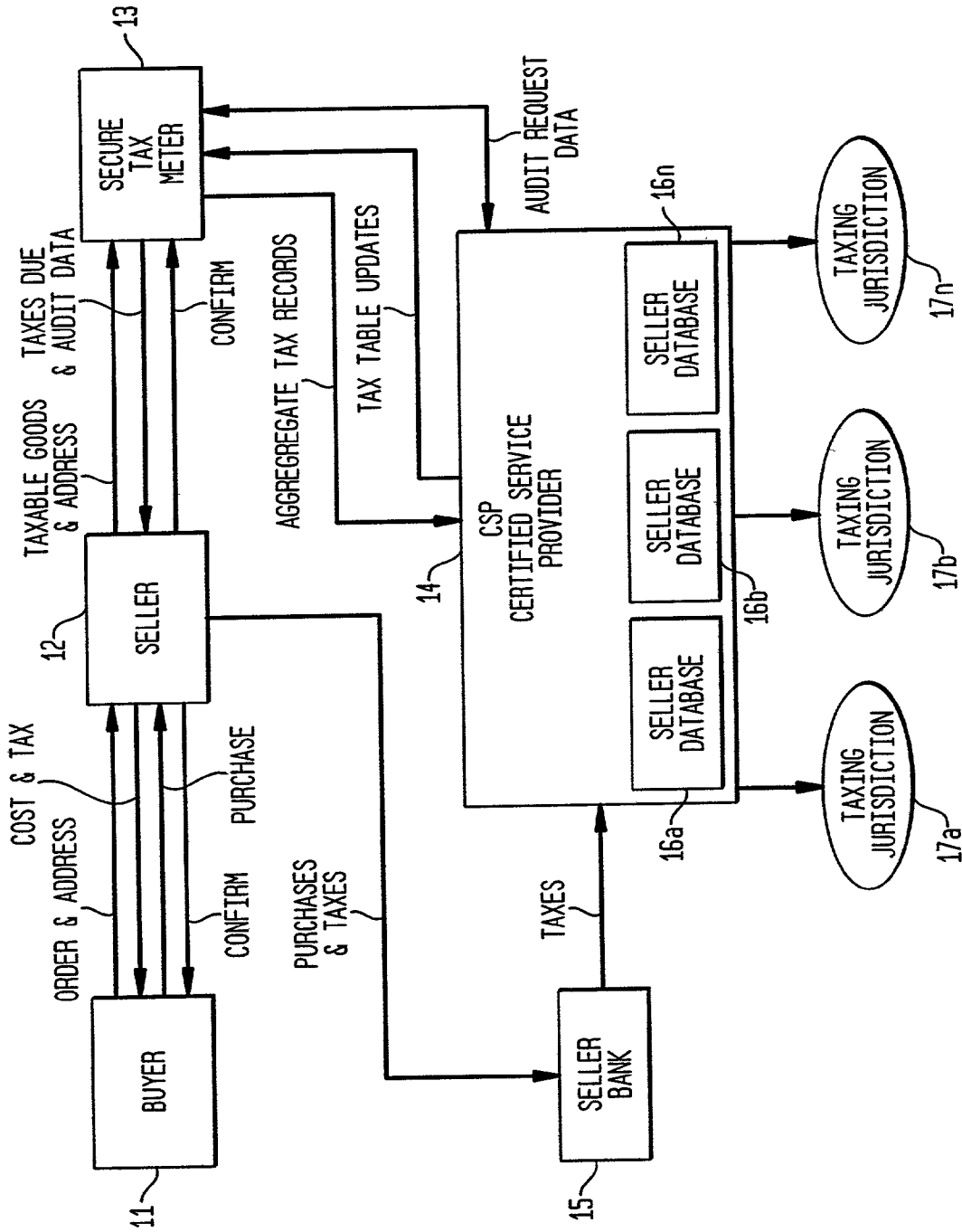
FIG. 1 is a drawing of a streamlined sales and use tax system that utilizes a secure tax meter.

Referring now to the drawings in detail, and more particularly to FIG. 1, the reference character 11 represents a plurality of buyers who purchase goods and/or services from a plurality of sellers 12. The remote sale may be via the Internet and/or catalog, etc. The information exchanged between buyer 11 and seller 12, and seller 12 and buyer 11, may be the particulars of the sales order and/or service; the location of the buyer; the cost of the sales order and/or service, including any sales or use tax that may be due; confirmation of the order by buyer 11, and acceptance of the order by seller 12. It will be obvious to one skilled in the art that buyer 11 and seller 12 may transmit other information, i.e., more specific location information, buyer exemption information, buyer unique identifier, buyer identification number, etc. Seller 12 may transmit the location of buyer 11, the items and/or services to be purchased by buyer 11, the classification of the items and/or services to be purchased by buyer 11, and the cost of the items and/or services purchased by buyer 11 to secure tax meter 13 ("meter 13").

Each seller 12 will have meter 13 located at their site. The seller's site may be a physical site or be hosted by an Internet service provider or an e-commerce service provider such as an Internet mall. Seller 12 receives from meter 13 the amount of taxes due on the sale. Meter 13 has been certified by the taxing jurisdictions and must comply with the taxing jurisdiction's rules and regulations to maintain its certification. Meter 13 maintains a log of all sales and/or use tax transactions. Meter 13 transmits the aggregate tax records, i.e., a log of the total sales and/or use tax due each jurisdiction to certified service provider (CSP) 14. CSP 14 transmits updates of sales and use tax tables to meter 13. Meter 13 calculates and logs the tax and transmits the amount of taxes that are due to seller 12. Meter 13 also verifies the integrity of its tax tables and digitally signs all tax transactions. The tax calculation performed by meter 13 may be executed by the sales tax software sold by Taxware International, Inc. of 27 Congress Street, Salem, Mass. 01970, or the sales tax software sold by Vertex, Inc., of 1041 Old Cassat Road, Berwyn, Pa. 19312, or other similar software and/or system. CSP 14 has been certified by the taxing jurisdictions and must comply with the taxing jurisdiction's rules and regulations to maintain its certification.

Periodically, seller 12 will transmit the monies it receives from buyer 11 to seller bank 15. Bank 15 will periodically send the taxes that are due to CSP 14. Meter 13 contacts CSP 14 and will provide encrypted audit data to each taxing jurisdiction 17a, 17b, . . . 17n upon a request from CSP 14. CSP 14 downloads updated sales and use tax tables to meter 13, verifies correct operation of meter 13 and retrieves aggregate tax data from meter 13.

CSP 14 will set up tax record databases 16a, 16b, . . . 16n for each seller 12 in each taxing jurisdiction 17a, 17b, . . . 17n. CSP 14 will aggregate the payments that are due to taxing jurisdictions 17a, 17b, . . . 17n; prepare documentation (tax returns) for taxing jurisdictions 17a, 17b, . . . 17n; submit documentation to taxing jurisdictions 17a, 17b, . . . 17n; submit tax revenues to jurisdictions 17a, 17b, . . . 17n; and, support taxing jurisdictions 17a, 17b, . . . 17n when they audit buyer 11. CSP 14 can restrict taxing jurisdictions' 17a, 17b, . . . 17n access to data while still enabling complete disclosure of information in the support of tax audits. This is accomplished by separating the data received from meter 13 into several separate seller tax record databases 16a, 16b, . . . 16n and restricting access to those seller tax record databases 16a, 16b, . . . 16n. Separate seller tax record databases 16a, 16b, . . . 16n exist for each taxing jurisdictions 17a, 17b, . . . 17n.

Taxing jurisdictions 17a, 17b, . . . 17n will receive an aggregate total of all taxes due for all the transactions for which taxes are due the taxing jurisdictions, all transactions in which taxes would normally be due the taxing jurisdictions but for which an exemption has been claimed, all tax returns generated and filed by CSP 14 with taxing jurisdictions 17a, 17b, . . . 17n; and, a log of all financial transactions with taxing jurisdictions 17a, 17b, . . . 17n. Taxing jurisdictions 17a, 17b, . . . 17n are restricted from viewing each other's databases. In addition, sellers stored in seller tax record databases 16a, 16b, . . . 16n may be stored with an alias (e.g., a seller ID number) which is not normally exposed to taxing jurisdictions 17a, 17b, . . . 17n. Taxing jurisdictions 17a, 17b, . . . 17n could audit seller tax record databases 16a, 16b, . . . 16n and tax return information based upon seller ID number. A seller's identity would be disclosed to a taxing jurisdiction 17a, 17b, . . . 17n only if there were sufficient suspicion of fraud based upon audit data. The foregoing audits also may be done for buyers 11.

A seller 12 may view the contents of his/her seller tax record databases 16a, 16b, . . . 16n. A seller tax record database 16a, 16b, . . . 16n contains an aggregate record of transactions the seller has conducted, a record of all tax returns filed by CSP 14 on behalf of the seller 12, a record of all financial transactions with the seller 12, and a record of audits performed by taxing jurisdictions 17a, 17b, . . . 17n. Seller tax record database 16a, 16b, . . . 16n may also contain a record of all transactions the seller has conducted.

CSP 14 is an agent certified by taxing jurisdictions 17a, 17b, . . . 17n. CSP 14 determines the total amount of taxes due to each taxing jurisdiction; pays the taxes to taxing jurisdictions 17a, 17b, . . . 17n; and files tax returns with taxing jurisdictions 17a, 17b, . . . 17n on behalf of sellers 12. CSP 14 also allows taxing jurisdictions 17a, 17b . . . 17n to audit sellers 12. CSP 14 may be an automated computer system which performs data processing and financial transactions.

Figure 2:
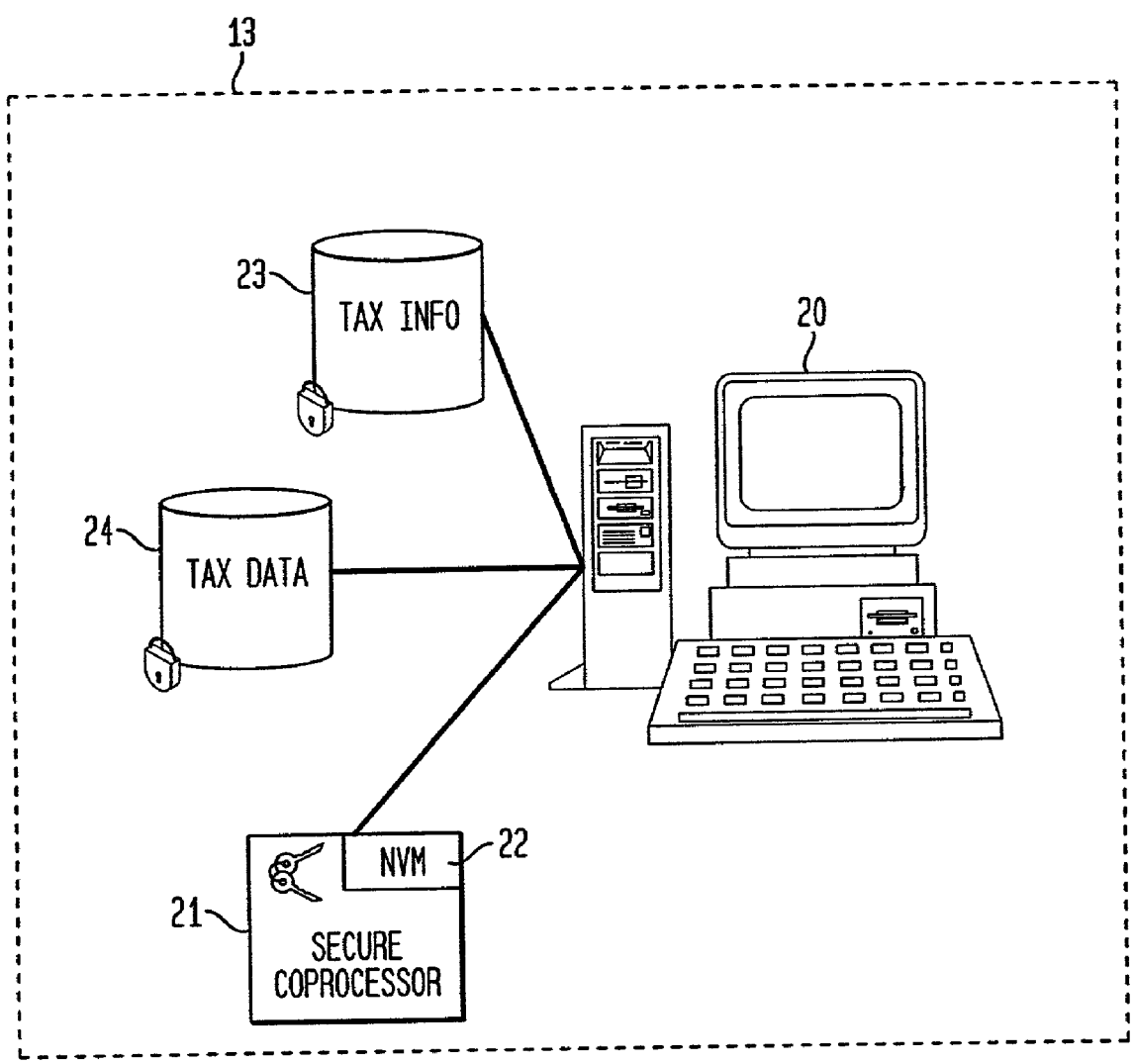
FIG. 2 is a drawing of a secure tax meter.

FIG. 2 is a drawing of a secure tax meter 13 ("Meter 13"). Meter 13 comprises a host computer 20 that is coupled to a secure coprocessor 21 containing a non-volatile memory 22;

a secure tax information database; and a secure tax database 24. Computer 20 functions as a communication interface between databases 23 and 24 secure coprocessor 21, and other seller systems. Secure coprocessor 21 preferably is responsible for the security and accuracy of tax calculation and accounting. Secure coprocessor 21 is a tamper-resistant module, i.e., the I.B.M 4758 Cryptocard, in order to ensure that the seller is not able to tamper with the tax calculation and accounting functions. Secure coprocessor 21 contains non-volatile memory (NVM) 22 that is used to store security parameters, configuration data and aggregate tax totals. The security parameters include such items as secure coprocessor serial number, expiration date of the secure coprocessor, cryptographic keys, etc. The configuration data includes such items as tax jurisdiction liability, seller unique identifier, seller identification number, frequency of contact with CSP, etc. Aggregate tax totals are maintained in secure coprocessor 21 for each taxing jurisdiction. Each aggregate total represents all the taxes due to all the tax jurisdictions within a particular state. These totals are maintained within secure coprocessor 21 to protect them from unauthorized modification. The total tax collected for each jurisdiction may be maintained optionally in secure coprocessor 21; however, this data may also be extracted from the tax data database 24.

The tax information database 23 contains information necessary to calculate taxes due on a sale. Tax information database 23 contains item classifications, tax rates, tax-exempt information, tax regulations, etc. Tax information database 23 must be protected against modification to ensure that a seller does not change tax rates, exemption information, tax rules and the like. This protection is accomplished by having CSP 14 (FIG. 1) digitally sign or otherwise cryptographically protect the database (for example, using the Digital Signature Algorithm (DSA) described in FIPS PUB 186, dated Jan. 15, 1977, and published by the United States Department Of Commerce, National Bureau of Standards, herein incorporated by reference).

The secure coprocessor 21 verifies the digital signature of tax information database 23 (or portions of tax information database 23) prior to processing transactions to ensure that tax information database 23 has not been modified.

Tax data database 24 contains a log of all transactions processed by secure coprocessor 21. Each entry in this log is digitally signed by secure coprocessor 21 to ensure that any modification of a log entry is detectable. The log may also be encrypted to protect the privacy of the information (e.g., seller addresses and individual transactions) from computer operators and administrators (this might be particularly useful if a seller's e-commerce system has been outsourced and is being operated by a third party). However, the seller may desire to analyze or process the data contained in the log (e.g., to determine the most effective means of advertising in a given area based upon the total amount of business in that area). The system allows this type of processing, since any attempted modification of tax data database 24 is detectable using a combination of digital signature verification and data analysis (using the aggregate totals or other data stored in secure coprocessor 21 to determine if log entries have been deleted). It should also be noted that while a taxing jurisdiction may have the right to audit tax data in tax data database 24, there is no need to provide the taxing jurisdictions 17a, 17b, . . . 17n or CSP (FIG. 1) 14 with details of every transaction (as will hereinafter be described). As a result, meter 13 allows sellers to maintain control of their sensitive data.

Figure 3:
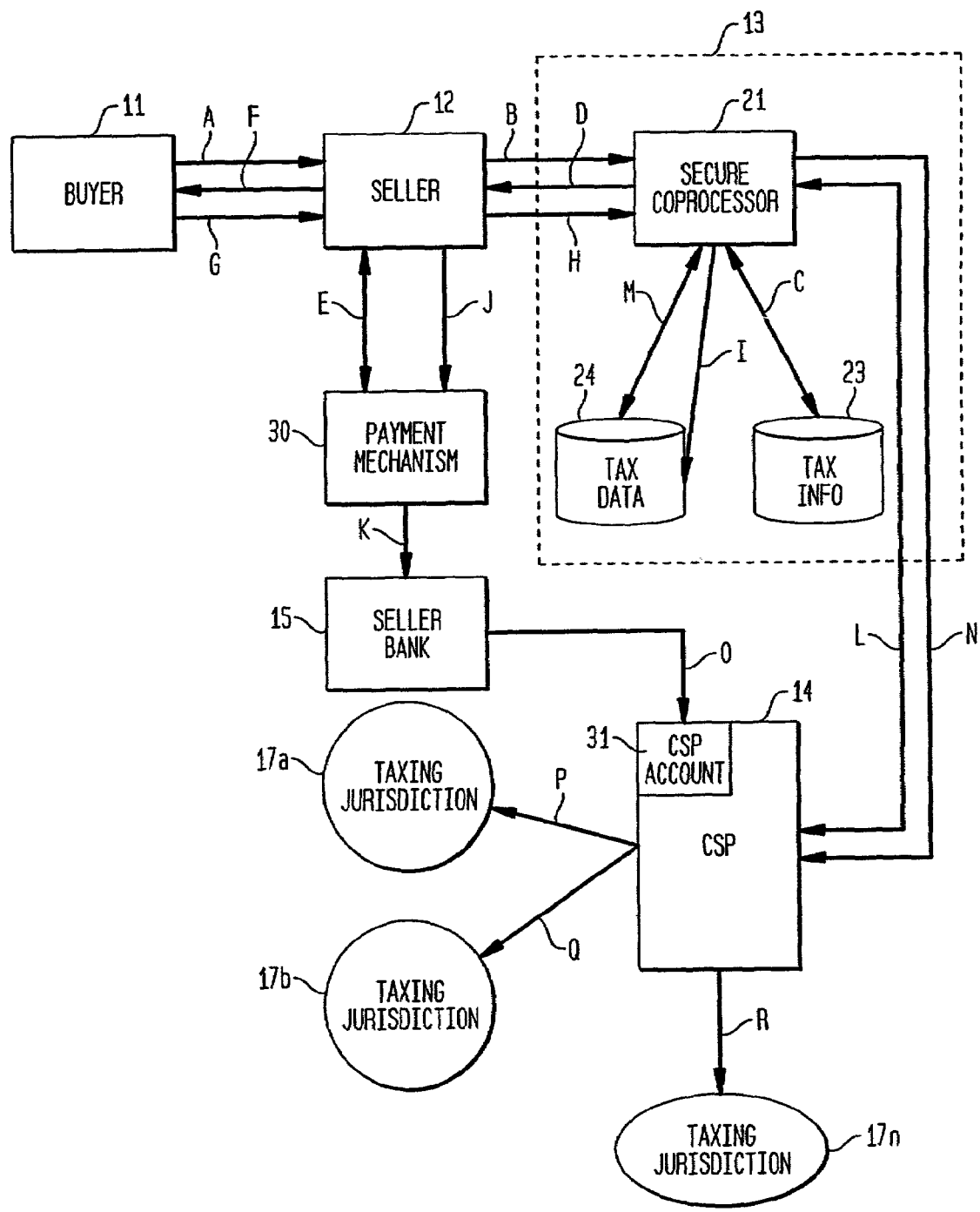
FIG. 3 is a drawing showing the transaction flow of the system described in FIG. 1.

FIG. 3 is a drawing showing the transaction flow of the system described in FIG. 1. The transaction begins when buyer 11 requests to purchase goods and/or services from seller 12 via A. It will be understood that all communications may be securely transmitted, i.e., by using a secure protocol such as a secure socket layer (SSL), etc. Then seller 12 collects buyer information, including tax data, i.e., location, exemption status, from buyer 11. Seller 12 sends itemized purchase and buyer tax information to secure coprocessor 21 via connection B. Then secure coprocessor 21 verifies the integrity of tax information database 23 by performing a digital signature verification. After verification of the digital signature, secure coprocessor 21 retrieves appropriate tax rates from tax information database 23 via C. Now secure coprocessor 21 calculates the applicable taxes that are due. At this point, secure coprocessor 21 sends the result of the tax calculation to buyer 12 via D. If necessary, seller 12 verifies payment availability (e.g., credit card approval, line of credit check, etc.) from payment mechanism 30 via E. Then, seller 12 presents a finalized statement to buyer 11 and requests confirmation of the sale via F. Then buyer 11 confirms the sale via G. Then seller 12 confirms the sale to secure coprocessor 21 via H. Secure coprocessor 21 adds all taxes that are due for the transactions conducted with seller 12 to the appropriate aggregate total, i.e., the aggregate total for a state, and stores the appropriate aggregate total in NVM 22 (FIG. 2). Secure coprocessor 21 digitally signs a transaction log entry corresponding to the details of the transaction (amount, date, taxes due, etc.) and adds the entry to tax data database 24 via 1. The digitally signed log entry may be provided to buyer 11 as a secure receipt. Seller 12 confirms the sale to payment mechanism 30 (credit card, line of credit, etc.) via J. Then funds for the total amount of the sale are transferred to seller bank 15 via K. Secure coprocessor 21 periodically will contact CSP 14 via a connection L. CSP 14 interrogates secure coprocessor 21 to ensure that secure coprocessor 21 is functioning properly. If secure coprocessor 21 fails to contact CSP 14 within a predetermined period of time, e.g., weekly, secure processor 21 automatically "shuts down" and refuses to process any additional tax transactions until such contact has been made. If CSP 14 determines that secure coprocessor 21 is not functioning properly, CSP 14 may instruct secure coprocessor 21 to "shut down" until any problems can be resolved. CSP 14 may also initiate any updates that may need to take place, i.e., revisions or tax table updates. CSP 14 will also request tax data from secure coprocessor 21. Secure coprocessor 21 verifies the integrity of tax data in tax data database 24 via M using digital signature verification and by comparing the tax data with the aggregate totals stored in the secure coprocessor 21.

Secure coprocessor 21 determines the total tax due to each tax jurisdiction 17a, 17b, . . . 17n (e.g., state, county, city) based upon the transaction history obtained from the tax data tax data database 24. The secure coprocessor 21 digitally signs the resulting tax totals for each tax jurisdiction 17a, 17b, . . . 17n. Secure coprocessor 21 may also digitally sign other data required by certain tax jurisdictions 17a, 17b, . . . 17n, e.g., certain states require that specific information be maintained and reported pertaining to purchases which are exempt from tax.

Secure coprocessor 21 sends the tax totals for each jurisdiction 17a, 17b . . . 17n to CSP 14 via N. CSP 14 verifies the digital signature(s), and CSP 14 periodically initiates an electronic funds transfer (EFT) transaction to transfer funds collected from the sellers account in seller bank 15 to CSP account 31 via 0. CSP 14 periodically sends tax returns to taxing jurisdictions 17a, 17b, . . . 17n and initiates EFT transfers of funds to taxing jurisdictions 17a, 17b, . . . 17n via P, Q and R.

The use of meter 13 enables sellers to maintain control over the availability of their transaction processing system since they are not forced to rely upon a third party agent, on-line service for real-time transaction processing. Taxing jurisdictions 17*a*, 17*b*, . . . 17*n* can be assured that the above-mentioned system that has been designed to protect against tampering and/or modification is in use by a seller. As a result, sellers are not required to provide taxing jurisdictions 17*a*, 17*b*, . . . 17*n* or CSP 14 with details of every transaction processed. However, meter 13 does provide taxing jurisdictions 17*a*, 17*b*, . . . 17*n* with the capability to examine detailed transaction records in cases where it might be necessary, for instance, in cases where fraud is suspected.

Figure 4:
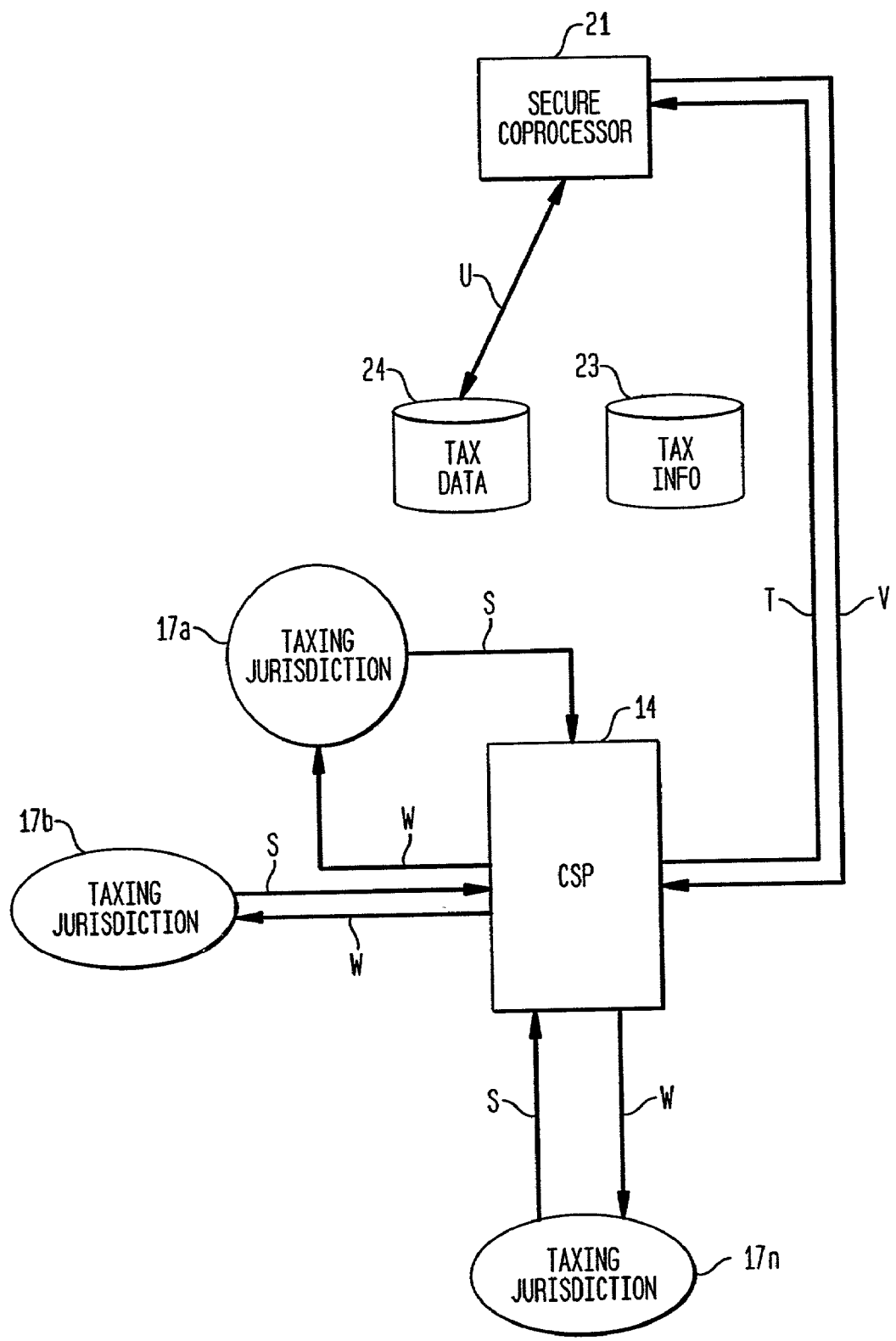
FIG. 4 is a drawing describing the process shown in FIG. 3.

FIG. 4 is a drawing describing the process shown in FIG. 3. A taxing jurisdiction 17*a*, 17*b* . . . 17*n* requests detailed transaction records for a particular seller from CSP 14 via S. Then CSP 14 contacts sellers secure coprocessor 21 via T or waits until the next communication initiated by secure coprocessor 21 via T. CSP 14 interrogates secure coprocessor 21 to ensure that secure coprocessor 21 is functioning properly. If CSP 14 determines that secure coprocessor 21 is not functioning properly, CSP 14 may instruct secure coprocessor 21 to "shut down" until any problems can be resolved. The CSP 14 may also initiate any updates that may need to take place (e.g., software revisions or tax table updates) at this time. CSP 14 also requests detailed transaction records from secure coprocessor 21 for the taxing jurisdiction 17*a*, 17*b*, . . . 17*n*.

Secure coprocessor 21 verifies the integrity of the tax data in tax data database 24 via U using digital signature verification and by comparing the tax data with the aggregate totals stored in the secure coprocessor 21. Secure coprocessor 21 also extracts the requested detailed transaction records from the tax data database 24. The secure coprocessor 21 encrypts the detailed transaction records for the taxing jurisdiction 17*a*, 17*b*, . . . 17*n*, (e.g. according to the Public Key Cryptographic System (PKCS)#1 standard). This encryption ensures that CSP 14 will not be able to read the detailed transaction records. Now secure coprocessor 21 sends the encrypted detailed transaction records to CSP 14 via V. Then CSP 14 sends the encrypted detailed transaction records to the taxing jurisdiction 17*a*, 17*b*, . . . 17*n* via W. Optionally, CSP 14 may notify seller 12 that the above records are being examined. Furthermore, CSP 14 may allow seller 12 to review and approve transaction records for a given period before they are sent. Taxing jurisdiction 17*a* decrypts the detailed transaction records and may perform a more detailed analysis of the records.

Figure 5:
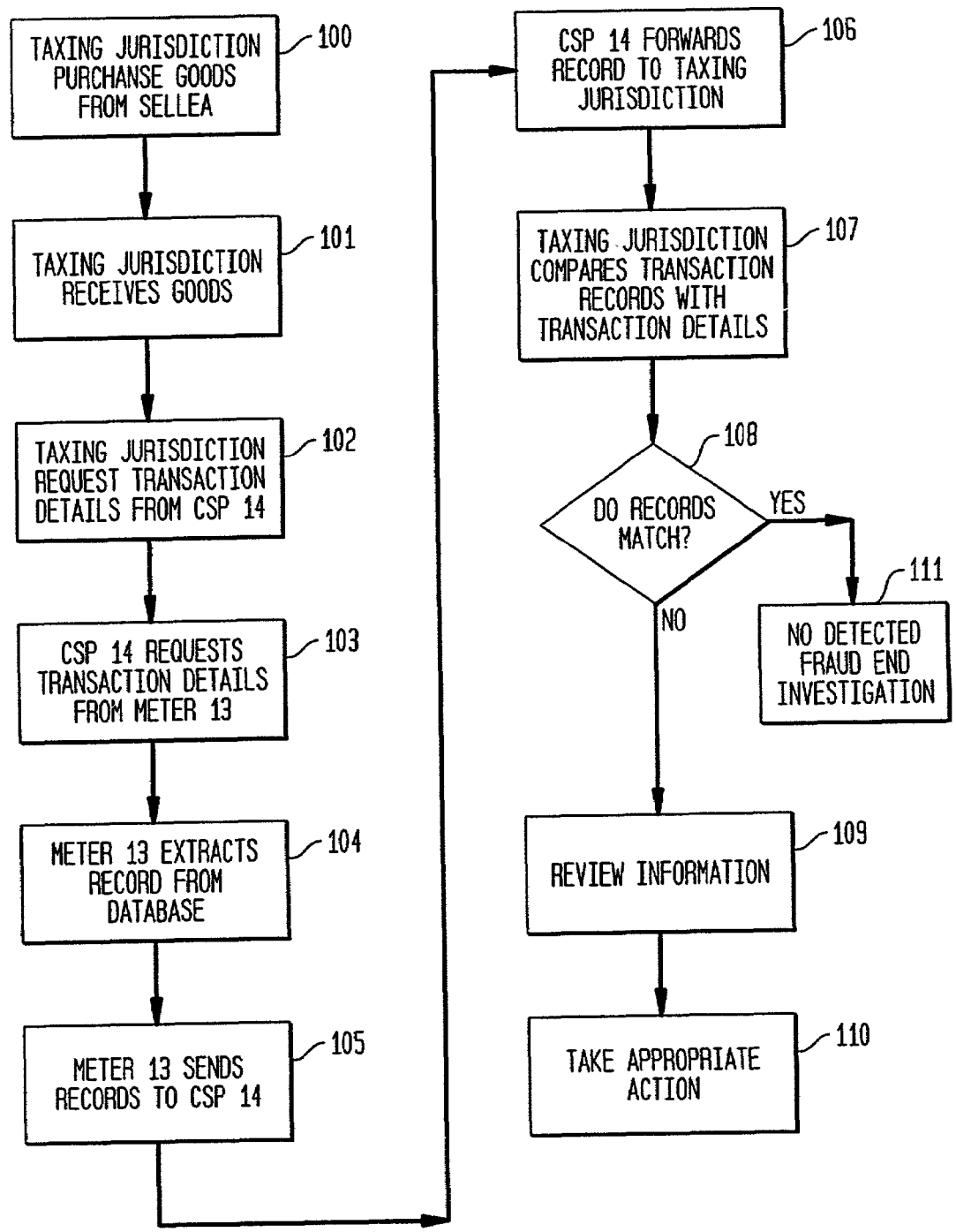
FIG. 5 is a flow chart showing how a taxing jurisdiction may detect fraud and obtain evidence regarding fraudulent transactions.

FIG. 5 is a flow chart showing how a taxing jurisdiction may detect fraud and obtain evidence regarding fraudulent transactions. An investigation for the commission of fraud and/or improper seller behavior to a taxing jurisdiction 17*a*, 17*b*, . . . 17*n* may be detected by a number of methods. Analyzing data to identify seller trends and observing a change in those trends, such as a drop off in the frequency and/or number of sales, noticing an inordinate number of canceled transactions or returned items. This trend data may be based upon a single seller or may include data from other similar sellers. The transaction begins when a specific taxing jurisdiction, i.e., 17*a*, purchases goods and/or services from a seller in step 100. Taxing jurisdiction 17*a* will record the transaction identification number and other details regarding the above purchase. Taxing jurisdiction 17*a* may utilize an agent to purchase the goods and/or services and/or use an alias to purchase the goods and/or services. Taxing jurisdiction 17*a* will receive the purchased goods and/or services in step 101. In step 102, taxing jurisdiction 17*a* will request transaction details of the aforementioned purchase from CSP 14. Then, in step 103, CSP 14 requests transaction details for the above purchase from meter 13. Now meter 13 will extract transaction records of the purchase from its database in step 104.

At this point in step 105, meter 13 sends the appropriate record to CSP 14. The above record may be encrypted for taxing jurisdiction 17*a* by using the public key of taxing jurisdiction 17*a*, so that CSP 14 cannot view the above record. In step 106, CSP 14 forwards the aforementioned record to taxing jurisdiction 17*a*. Then in step 107, taxing jurisdiction 17*a* compares the record produced by meter 13 with the information regarding the purchase that taxing jurisdiction obtained in step 100. In step 108, taxing jurisdiction 17*a* determines whether or not the record produced by meter 13 matches the information regarding the purchase that taxing jurisdiction obtained in step 100. If the record produced by meter 13 matches the information regarding the purchase that taxing jurisdiction made in step 100, the seller did not commit any improper behavior for the investigated transaction. If no improper seller behavior was detected, step 111 will be the next step. In step 111, the investigation ends. On the other hand, if taxing jurisdiction 17*a* determines in step 108 that the record produced by meter 13 does not match the information regarding the purchase that taxing jurisdiction made in step 100, or if no record exists, the seller may have committed improper behavior in the investigated transaction, e.g., by not confirming completion of the transaction to secure tax meter 13, or by lowering the sale amount requested to meter 113 and collecting on the original total. Then in step 109, taxing jurisdiction 17*a* will review all the information it has obtained for the investigated transaction, i.e., credit card statement, receipts from transaction, records of transaction, etc. If discrepancies are observed in step 109, the next step will be step 110. In step 110, taxing jurisdiction 17*a* may determine to expand the investigation of seller 12, conduct a full, on-site audit of seller 12, audit all seller 12 transactions, and/or use the information obtained in this investigation as evidence in a legal proceeding against seller 12.

The above specification describes a new and improved method for taxing jurisdictions to collect sales and/or use taxes from Internet and catalog sales. It is realized that the above description may indicate to those skilled in the art additional ways in which the principals of this invention may be used without departing from the spirit. Therefore, it is intended that this invention be limited only by the scope of the appended claims.

What is claimed is:

1. A method utilizing a computer for collecting sales and/or use taxes on remote sales, said method includes the steps of:
   a) collecting by an agent seller's information regarding remote sales made by buyers;
   b) calculating the correct taxing jurisdiction's aggregate total sales and/or use tax to be paid by buyers to sellers for remote sales transactions;
   c) collecting by sellers from buyers the correct sales and/or use tax;
   d) collecting by an agent the correct sales and/or use tax received by sellers; and
   e) accessing seller information for a taxing jurisdiction segmented by the agent for that jurisdiction with a unique identifier wherein the identity of the seller remains secret; and
   (f) paying by an agent each taxing jurisdiction the taxes that are due.

2. The method claimed in claim 1, wherein buyers are given a receipt for the taxes they have paid.

3. The method claimed in claim 1, wherein the seller's sales are also segmented for each buyer.

4. The method claimed in claim 1, further including the step of:
   reporting to the taxing jurisdictions the taxes that have been collected.

5. The method claimed in claim 1, further including the step of:
   filing reports by the agent for sellers with the taxing jurisdictions for the taxes that have been collected.

6. The method claimed in claim 1, further including the step of:
   filing tax returns by the agent for sellers with the taxing jurisdictions for the taxes that have been collected.

7. The method claimed in claim 1, further including the step of:
   giving by the agent sellers financing to pay the sales and/or use taxes that are due.

8. The method claimed in claim 1, wherein the buyer information segmented by the agent may be accessed by an unique identifier.

9. The method claimed in claim 1, wherein the seller information segmented by the agent may be accessed by an unique identifier.

10. The method claimed in claim 9, further including the step of:
    identifying potentially seller fraudulent behavior by running various checks of the segmented information.

11. The method claimed in claim 10, further including the step of:
    identifying a strange drop-off in the number of seller transactions in the segmented information.

12. The method claimed in claim 10, further including the step of:
    examining the history of seller transactions in the segmented account to determine seller trends.

13. The method claimed in claim 10, further including the step of:
    comparing the transaction volume, dollar volume and transaction types relative to other similar sellers.

14. The method claimed in claim 10, further including the step of:
    identifying an inordinate number of cancelled transactions in the segmented transactions.

15. The method claimed in claim 14, further including the step of:
    establishing watermarks for different types of businesses to identify an inordinate amount of returned merchandise for a particular type of business.

16. The method claimed in claim 10, further including the step of:
    notifying the taxing jurisdiction of the seller's potentially fraudulent behavior.

17. The method claimed in claim 10, further including the step of identifying patterns that indicate that a seller may not be reporting the entire amount of taxes collected.

18. The method claimed in claim 10, further including the step of:
    examining cancelled transactions.

19. The method claimed in claim 1, wherein the agent reveals the identity of the seller if there is a suspicion of fraud based upon the segmented information.

20. The method claimed in claim 1, wherein a seller is given notice that a taxing jurisdiction is studying its segmented sales and/or use taxes collected.

21. The method claimed in claim 1, wherein a taxing jurisdiction may access the segmented sales and/or use taxes collected only after specified time period has passed.

22. The method claimed in claim 1, wherein the taxing jurisdictions pay the agent for services rendered by the agent.

23. The method claimed in claim 1, further including the step of:
    receiving responses from buyers indicating acceptance of the sale.

* * * * *